United States Patent
Kwon

(10) Patent No.: US 12,050,447 B2
(45) Date of Patent: Jul. 30, 2024

(54) METHOD FOR SECURING PROGRAM SAFETY OF HVDC SYSTEM AND HVDC SYSTEM USING SAME

(71) Applicant: HYOSUNG HEAVY INDUSTRIES CORPORATION, Seoul (KR)

(72) Inventor: Hyo Chul Kwon, Suwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 339 days.

(21) Appl. No.: 17/623,137

(22) PCT Filed: Feb. 1, 2021

(86) PCT No.: PCT/KR2021/001308
§ 371 (c)(1),
(2) Date: Dec. 27, 2021

(87) PCT Pub. No.: WO2021/157982
PCT Pub. Date: Aug. 12, 2021

(65) Prior Publication Data
US 2022/0269236 A1  Aug. 25, 2022

(30) Foreign Application Priority Data
Feb. 5, 2020  (KR) .................. 10-2020-0013434

(51) Int. Cl.
*G05B 19/042* (2006.01)
(52) U.S. Cl.
CPC .. *G05B 19/0428* (2013.01); *G05B 2219/2639* (2013.01)
(58) Field of Classification Search
CPC ........ G05B 19/0428; G05B 2219/2639; G06F 11/36; G06F 21/57; G06F 11/3668; H02J 3/36; Y02E 60/60
See application file for complete search history.

(56) References Cited

U.S. PATENT DOCUMENTS

| | | | |
|---|---|---|---|
| 5,787,367 A | 7/1998 | Berra | |
| 5,859,911 A | 1/1999 | Angelo et al. | |
| 2011/0078408 A1 | 3/2011 | Ishida et al. | |
| 2011/0282508 A1 | 11/2011 | Goutard et al. | |
| 2019/0309728 A1* | 10/2019 | Abeyasekera | .......... F03D 9/257 |

FOREIGN PATENT DOCUMENTS

| | | | |
|---|---|---|---|
| JP | 2006011748 A | * | 1/2006 |
| KR | 10-2017-0006611 A | | 1/2017 |

OTHER PUBLICATIONS

English Translation of JP-2006011748-A (Year: 2006).*

* cited by examiner

*Primary Examiner* — Charles R Kasenge
(74) *Attorney, Agent, or Firm* — NKL LAW; Jae Youn Kim

(57) ABSTRACT

A method for securing the program safety of an HVDC system according to the present invention comprises the steps of: calculating, by a controller of the HVDC system, a BIOS program eigenvalue after loading a BIOS when power is applied; receiving, by the controller, a BIOS program eigenvalue of the controller prestored in a higher system of the controller; and comparing the BIOS program eigenvalue calculated in the controller and the BIOS program eigenvalue prestored in the higher system so as to identify whether or not the eigenvalues are identical and, if the eigenvalues are not identical, stopping execution of a program and notifying the higher system that the eigenvalues are not identical.

5 Claims, 4 Drawing Sheets

METHOD FOR SECURING PROGRAM SAFETY OF HVDC SYSTEM AND HVDC SYSTEM USING SAME

TECHNICAL FIELD

The present invention relates to a method of securing program safety for security of a power system, and more particularly, to a method of securing program safety in a high voltage direct current (HVDC) system and an HVDC system using the same.

BACKGROUND ART

Due to the ease of transformation using a transformer, even in a process of converting a direct current (DC) into a DC, a method of converting a DC into an alternating current (AC) and then performing transformation to reconvert an AC into a DC has been used for a long time.

With the recent development of power electronic devices and the rapid development of technologies for efficiently controlling on/off of a plurality of power devices, an application field of DC-to-DC converters that directly convert a DC into a DC is expanding, and a high voltage direct current (HVDC) field using semiconductor transformation technology for high voltage power is also expanding.

However, conventionally, there has been no way to properly check the safety of a program itself within a controller of an HVDC system. Thus, there has been a problem in that there is no countermeasure when a program stored in a flash memory or read-only memory (ROM) is altered due to a cyber attack on a system or a hardware (H/W) error.

DISCLOSURE

Technical Problem

The present invention is directed to providing a method of securing program safety in a high voltage direct current (HVDC) system, in which the soundness of a program itself may be checked in a controller of an HVDC system, thereby coping with a program stored in a flash memory or read-only memory (ROM) being altered due to a cyber attack on a system or due to a hardware (H/W) error.

The present invention is also directed to providing a method of securing program safety in an HVDC system, which is capable of properly coping with a program alteration due to a cyber attack on an HVDC system or due to an H/W error, thereby improving the security of the HVDC system.

Technical Solution

According to one embodiment of the present invention, a method of securing program safety in a high voltage direct current (HVDC) includes operation (a) of, when power is applied, loading, by a controller of an HVDC system, a basic input-output system (BIOS) and then calculating an eigenvalue of a BIOS program, operation (b) of receiving, by the controller, an eigenvalue of the BIOS program of the controller pre-stored in an upper level system of the controller, and operation (c) of comparing the eigenvalue of the BIOS program calculated by the controller with the eigenvalue of the BIOS program pre-stored in the upper level system to verify whether the calculated eigenvalue matches the pre-stored eigenvalue, when the calculated eigenvalue does not match the pre-stored eigenvalue, stopping executing of a program, and notifying the upper level system that the calculated eigenvalue does not match the pre-stored eigenvalue.

The method may further include operation (d) of calculating an eigenvalue of an operating system (OS) program of the controller stored in a non-volatile memory, and operation (e) of receiving a pre-stored eigenvalue of the OS program from the upper level system, comparing the pre-stored eigenvalue with the calculated eigenvalue of the OS program to verify whether the pre-stored eigenvalue matches the calculated eigenvalue, when the pre-stored eigenvalue matches the calculated eigenvalue, executing the OS program, and when the pre-stored eigenvalue does not match the calculated eigenvalue, stopping the executing of the program and notifying the upper level system that the calculated eigenvalue does not match the pre-stored eigenvalue.

Operation (d) may further include operation (d1) of, when the OS program of the controller is stored in a random-access memory (RAM), calculating the eigenvalue of the OS program.

The method may further include operation (f) of periodically calculating an eigenvalue of a program of the controller, and operation (g) of comparing the eigenvalue of the program calculated in operation (f) with an eigenvalue of the corresponding program pre-stored in the upper level system to verify whether the calculated eigenvalue matches the pre-stored eigenvalue, and when the calculated eigenvalue does not match the pre-stored eigenvalue, stopping the executing of the program and notifying the upper level system that the calculated eigenvalue does not match the pre-stored eigenvalue.

The HVDC system may include a human machine interface (HMI) which manages an integrated operation of an HVDC/modular multilevel converter (MMC) and performs program version and update management for power grid devices including sub-modules, an upper level controller (control & protection controller) which performs a system command response and state transfer, performs measurement and system control algorithms, and performs system protection algorithms, a valve base electronics (VBE) device which generates a control signal of a sub-module (SM) through a command obtained from the upper level controller and transmits the generated control signal, and a direct current (DC) power conversion SM which is used for DC-DC conversion through the control signal obtained from the VBE device.

The method may further include, before operation (a), operation (a0) of, when a program of the controller is stored in the upper level system, calculating and storing an eigenvalue of the program of the controller in advance.

Operation (a0) may further include operation (a01) of receiving, by the upper level system, an update command from the controller and receiving a new controller program, operation (a02) of calculating and storing an eigenvalue of the new controller program in the upper level system, operation (a03) of downloading the new controller program to the controller, operation (a04) of temporarily storing, by the controller, the downloaded new controller program in a random-access memory (RAM), and operation (a05) of calculating, by the controller, an eigenvalue of the new controller program, comparing the calculated eigenvalue with an eigenvalue of the new controller program stored in the upper level system to verify whether the calculated eigenvalue matches the stored eigenvalue, when the calculated eigenvalue matches the stored eigenvalue, storing the new controller program in the controller, and when the calculated eigenvalue does not match the stored eigenvalue, discarding a program temporarily stored in the RAM.

Advantageous Effects

When a method of securing program safety in a high voltage direct current (HVDC) system of the present invention is carried out, the safety of a program itself in each controller, such as a sub-module, can be periodically checked even in normal times or when power is applied, thereby taking appropriate action even when a program stored in a flash memory or read-only memory (ROM) is altered due to a cyber attack on a system or due to a hardware (H/W) error.

In addition, according to the present invention, it is possible to properly cope with a program alteration due to a cyber attack on an HVDC system or due to an H/W error, thereby improving the security of the HVDC system.

MODES OF THE INVENTION

Figure 1:
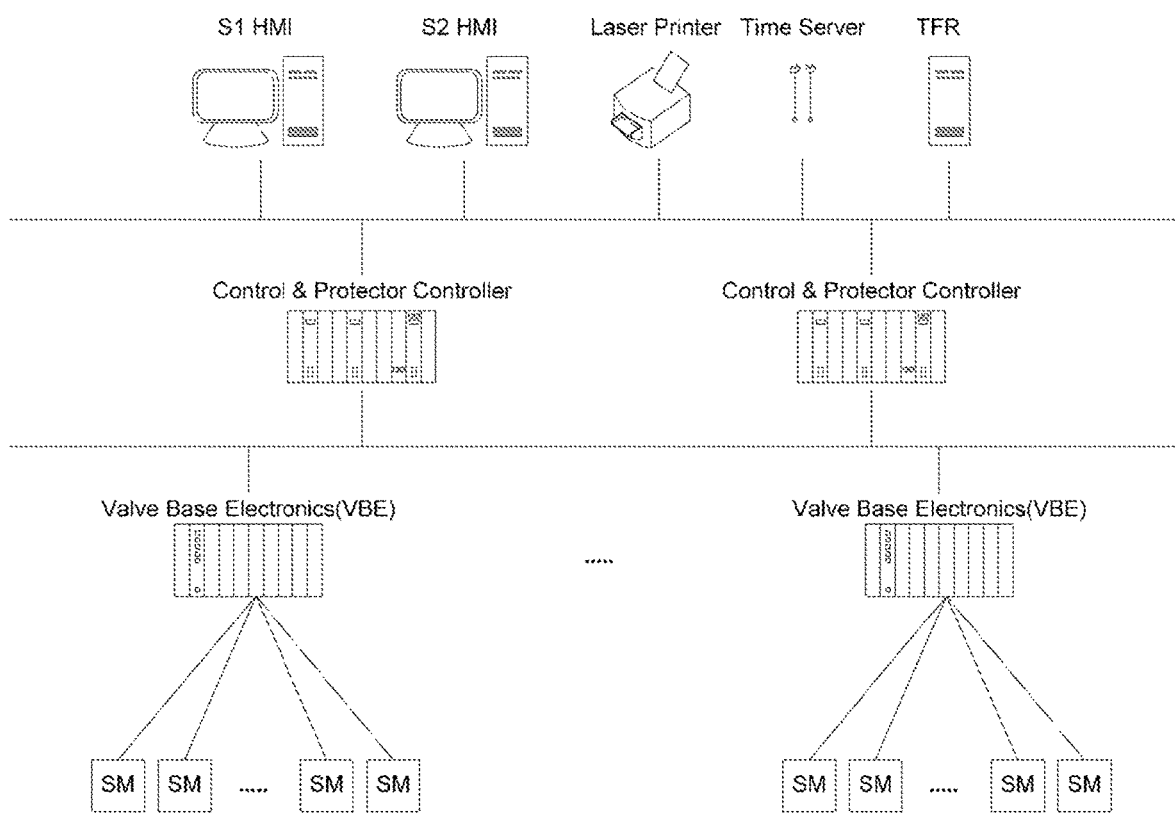
FIG. 1 is a block diagram illustrating a hierarchical configuration of a control system of a high voltage direct current (HVDC) system.

Hereinafter, detailed embodiments for implementing the present invention will be described with reference to the accompanying drawings.

In describing the present invention, although the terms, such as first, second, and the like, may be used to describe various elements, the elements should not be limited by the terms. The terms are used merely for the purpose of distinguishing one element from another element. For example, without departing from the scope of the present invention, a first element could be termed a second element, and similarly a second element could be also termed a first element.

It will be understood that when an element is referred to as being "connected" or "coupled" to another element, it can be directly connected or coupled to another element or intervening elements may be present.

The terminology used herein is for the purpose of describing particular embodiments only and is not intended to limit the present invention. The terms of a singular form may include plural forms unless otherwise specified.

It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

In addition, the shapes and dimensions of elements in the drawings may be exaggerated for clarity.

Figure 2:
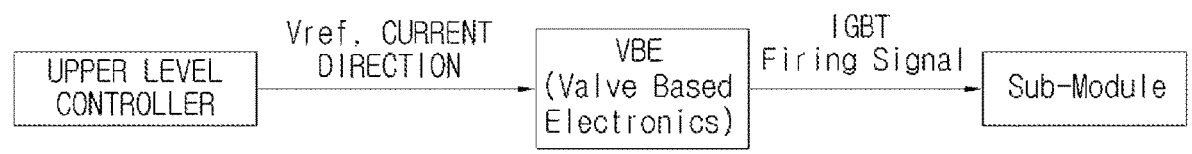
FIG. 2 is a schematic block diagram illustrating a control flow from an upper level controller to a sub-module in the hierarchical configuration of FIG. 1.

First, FIG. 1 is a block diagram illustrating a hierarchical configuration of a control system of a high voltage direct current (HVDC) system, and FIG. 2 is a schematic block diagram illustrating a control flow from an upper level controller to a sub-module in the hierarchical configuration of FIG. 1.

In FIG. 1, systems/devices having a highest operator level positioned in the upper section of the drawing may be devices/systems used for common power management in a system in which a plurality of power grid sets or power grids are connected. In relation to the present invention, a human machine interface (HMI) manages an integrated operation of an HVDC/modular multilevel converter (MMC) and performs program (operating system (OS) or firmware) version/update management for power grid devices including sub-modules.

The upper level controller (control & protection controller) is positioned in the middle section of the drawing. The upper level controller performs a system command response and state transfer, performs measurement and HVDC system control algorithms, and performs system protection algorithms.

In the lower section of the drawing, a valve base electronics (VBE) device is positioned. The VBE device generates an on/off signal of an insulated gate bipolar transistor (IGBT) in a sub-module (SM) through a command obtained from the upper level controller and then transmits corresponding information to an SM controller. Specifically, the VBE device receives a voltage reference and a current direction from the upper level controller and serves to generate an on/off signal (firing signal) of the IGBT in the SM.

The SMs are positioned in the lower section of the drawing. The SM controller, which controls the overall operation of the SM, turns the internal IGBT on/off through the on/off signal (firing signal) obtained from the VBE device. A concept of a control flow from the upper level controller to the sub-module is shown in FIG. 2.

Describing the role of the VBE device, first, the VBE device may form an optical communication channel for performing 1:1 optical communication with a plurality of SMs, and thus, a program (OS or firmware) of the SM controller may be updated using a VBE controller.

In addition, in an MMC-based HVDC system, the SMs of FIG. 1 constitute an MMC.

Figure 3:
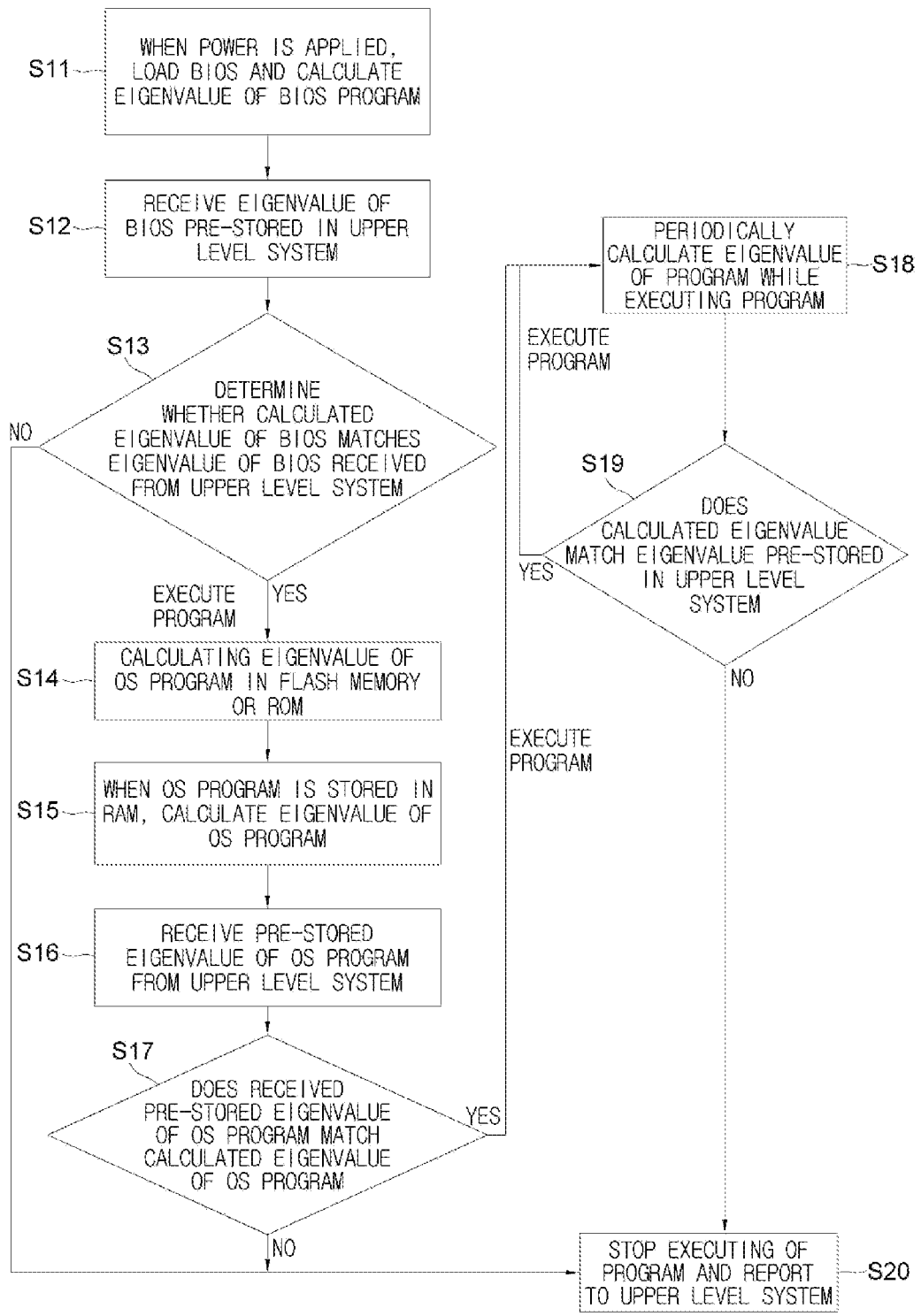
FIG. 3 is a flowchart illustrating a method of securing program safety in an HVDC system according to one embodiment of the present invention.

Next, FIG. 3 is a flowchart illustrating a method of securing program safety in an HVDC system according to one embodiment of the present invention.

Referring to FIG. 3, the method of securing program safety in an HVDC system according to one embodiment of the present invention is characterized in that program soundness is checked when power is applied or checked periodically.

First, the method of securing program safety in an HVDC system according to the present invention includes operation S11 of, when power is applied, loading a basic input-output system (BIOS) and then calculating an eigenvalue of a BIOS program, operation S12 of receiving an eigenvalue of the BIOS pre-stored in an upper level system, operation S13 of determining whether the calculated eigenvalue of the BIOS matches the eigenvalue of the BIOS received from the upper level system, operation S14 of calculating an eigenvalue of an OS program in a flash memory or read-only memory (ROM), operation S15 of, when the OS program is stored in a random-access memory (RAM), calculating the eigenvalue of the OS program, operation S16 of receiving a pre-stored eigenvalue of the OS program from the upper level system, operation S17 of determining whether the received pre-stored eigenvalue of the OS program matches the calculated eigenvalue of the OS program, operation S18 of periodically calculating an eigenvalue of a program while executing the program, operation S19 of determining whether the calculated eigenvalue of the program matches an eigenvalue of the program pre-stored in the upper level system, and operation S20 of stopping the executing of the program and reporting to the upper level system.

Here, in operation S11 of, when the power is applied, loading the BIOS and then calculating the eigenvalue of the BIOS program, and when power is applied to an HVDC system or a controller of the HVDC system, the controller of the HVDC system loads the BIOS and then calculates the eigenvalue of the BIOS program.

In operation S12 of receiving the eigenvalue of the BIOS pre-stored in the upper level system, the controller receives an eigenvalue of a BIOS program of the controller pre-stored in an upper level system of the controller in the HVDC system.

Here, an upper level system refers to a system present at a relatively high level when two systems are selected from components such as an HMI, an upper level controller, a VBE device, and an SM which constitute an HVDC system. On the other hand, a lower level system refers to a system present at a relatively lower level as compared with the upper level system.

As an example, when the lower level system is the SM, the upper level system may be the VBE device, the upper level controller, or the HMI. As another example, when the lower level system is the VBE device, the upper level system may be the high level controller or the HMI.

Meanwhile, a method of calculating a program eigenvalue can be implemented as various known methods such as a hash operation method, a checksum operation method, and a cyclic redundancy check (CRC) operation method, and a detailed description thereof will be omitted.

In the present invention, in an upper level system, a program eigenvalue of a program of a lower level system (controller) is calculated and stored in advance, and from when a new program is installed in the controller which is the lower level system, in the upper level system, an eigenvalue of the corresponding new program is calculated and stored in advance.

That is, when a program eigenvalue of the lower level system is used by being stored in the lower level system itself, since there is a possibility that the stored eigenvalue may also be changed when a program is altered due to a hardware (H/W) error or the like, the program eigenvalue is used by being calculated and stored in advance in the upper level system.

Figure 4:
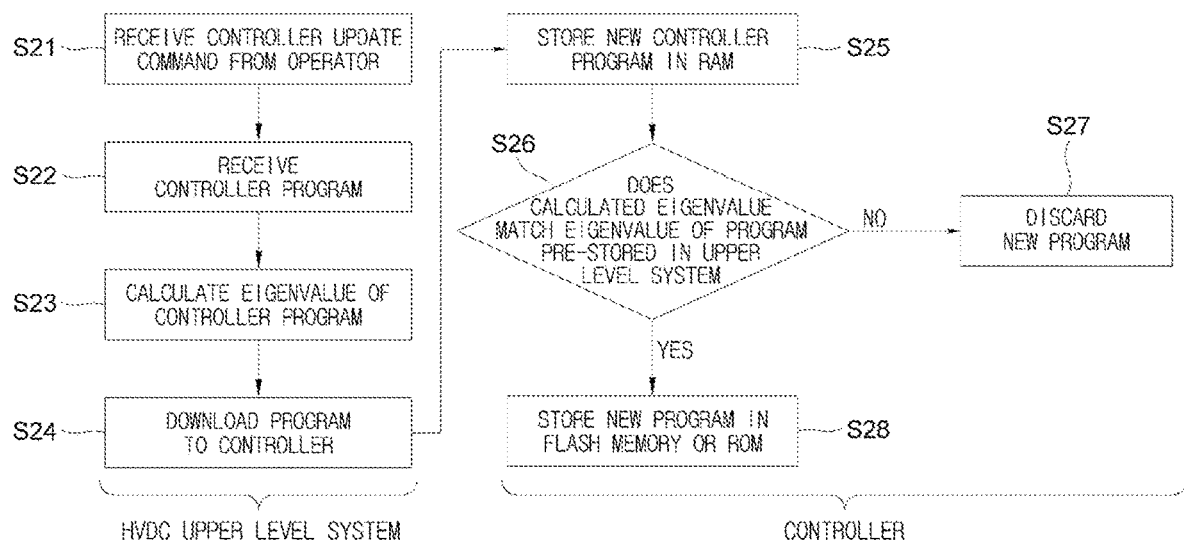
FIG. 4 is a flowchart for describing a method of calculating and storing a program eigenvalue in an upper level system in a method of securing program safety in an HVDC system according to one embodiment of the present invention.

FIG. 4 is a flowchart for describing a method of calculating and storing a program eigenvalue in an upper level system in a method of securing program safety in an HVDC system according to one embodiment of the present invention.

As shown in FIG. 4, the method of calculating and storing a program eigenvalue in an upper level system according to the present invention includes operation S21 of receiving a controller update command from an operator, operation S22 of receiving a program of a controller, operation S23 of calculating an eigenvalue of the program of the controller, operation S24 of downloading the program to the controller, operation S25 of storing a new program of the controller in a RAM, operation S26 of determining whether an eigenvalue of the new program matches a pre-stored program eigenvalue of an upper level system, operation S27 of, when the eigenvalue of the new program does not match the pre-stored program eigenvalue, discarding the new program, and operation S28 of, when the eigenvalue of the new program matches the pre-stored program eigenvalue, storing the new program in a flash memory or ROM.

In operations S21 and S22, a command for updating the controller program is received from the operator of an HVDC system, and the upper level system of the HVDC system receives the new controller program for updating the controller.

In operation S23, the upper level system calculates the eigenvalue of the received new controller program, and in operation S24, the upper level system downloads the received new controller program to the controller.

In operation S25, the controller temporarily stores the downloaded new controller program in the RAM, and in operation S26, the controller calculates the eigenvalue of the new controller program and compares the eigenvalue of the new controller program with an eigenvalue of the new controller program pre-stored in the upper level system to verify whether the eigenvalue of the new controller program matches the eigenvalue of the new controller program pre-stored in the upper level system.

As a verification result, when the eigenvalue of the new controller program does not match the eigenvalue of the new controller program pre-stored in the upper level system, in operation S27, it is determined that soundness of the new controller program is not secured, and the new program temporarily stored in the RAM is discarded. When the eigenvalue of the new controller program does not match the eigenvalue of the new controller program pre-stored in the upper level system, in operation S28, it is determined that soundness of the new controller program is secured, and the new program temporarily stored in the RAM is stored in the flash memory or ROM.

As described above, in the present invention, from when a new program is installed in a controller corresponding to a lower level system, an eigenvalue of the corresponding new program is used by being calculated and stored in advance in an upper level system.

Next, referring to FIG. 3 again, in operation S13 of determining whether the calculated eigenvalue of the BIOS matches the eigenvalue of the BIOS received from the upper level system, an eigenvalue of the BIOS program calculated by the controller is compared with the eigenvalue of the BIOS program pre-stored in the upper level system to verify whether the calculated eigenvalue matches the received eigenvalue. As a verification result, when the calculated eigenvalue does not match the received eigenvalue, in operation S20, the executing of the program is stopped, and the upper level system is notified that the eigenvalues do not match each other. When the calculated eigenvalue does not match the received eigenvalue, program booting is performed without change.

Operation S14 of calculating the eigenvalue of the OS program in the flash memory or ROM is an operation of calculating an eigenvalue of an OS program of the controller stored in a non-volatile memory and an operation in which, in order to check soundness of a stored OS, before the OS is driven, the soundness of the OS of the controller is checked.

Operation S15 of, when the OS program is stored in the RAM, calculating the eigenvalue of the OS program is an operation in which the eigenvalue is calculated to check the soundness of the OS once again just before the OS of the controller is started Operation S16 of receiving the pre-stored eigenvalue of the OS program from the upper level system is an operation in which, as a method of checking the soundness of the OS program of the controller, an eigenvalue of the OS program of the controller stored in the upper level system of the controller is received.

In operation S17 of determining whether the received pre-stored eigenvalue of the OS program matches the calculated eigenvalue of the OS program, the pre-stored eigenvalue of the OS program is received from the upper level system and is compared with the calculated eigenvalue of the OS program to verify whether the pre-stored eigenvalue matches the calculated eigenvalue. As a verification result, when the pre-stored eigenvalue matches the calculated eigenvalue, the OS program is executed, and when the pre-stored eigenvalue does not match the calculated eigenvalue, in operation S20, the executing of the program is stopped, and the upper level system is notified that the pre-stored eigenvalue does not match the calculated eigenvalue.

In operation S18, the eigenvalue of the program is periodically calculated during the executing of the program, and in operation S19, the eigenvalue of the program calculated in operation S18 is compared with the eigenvalue of the program of the controller pre-stored in the upper level system to verify whether the calculated eigenvalue matches the pre-stored eigenvalue.

As a verification result, when the calculated eigenvalue does not match the pre-stored eigenvalue, in operation S20, the executing of the program is stopped, and the upper level system is notified that the eigenvalues do not match each other. When the calculated eigenvalue matches the pre-stored eigenvalue, the program is executed without change.

According to the present invention as described above, in order to secure the safety of a controller program of an HVDC system, there is an effect of checking the soundness of a program itself and concurrently checking the soundness of a program for each driving stage of the program. In particular, before an OS is booted, the soundness of a BIOS program can be checked, when the OS is booted, the soundness of the OS program can be checked, and the soundness of stored programs can also be checked periodically.

In addition, as a result, it is possible to properly cope with a program alteration due to a cyber attack on an HVDC system or due to a H/W error, thereby improving the security of the HVDC system.

The embodiments have been set forth for the purpose of describing the present invention, not for limiting the scope of the present invention. Those skilled in the art may understand that various embodiments may be possible without departing from the spirit and scope of the present invention.

INDUSTRIAL AVAILABILITY

The present invention relates to a method of securing program safety for security of a power system and is available in a power system field.

The invention claimed is:

1. A method of securing program safety in a high voltage direct current (HVDC), the method comprising:
    operation (a) of, when power is applied, loading, by a controller of an HVDC system, a basic input-output system (BIOS) and then calculating an eigenvalue of a BIOS program;
    operation (b) of receiving, by the controller, an eigenvalue of the BIOS program of the controller pre-stored in an upper level system of the controller;
    operation (c) of comparing the eigenvalue of the BIOS program calculated by the controller with the eigenvalue of the BIOS program pre-stored in the upper level system to verify whether the calculated eigenvalue matches the pre-stored eigenvalue, when the calculated eigenvalue does not match the pre-stored eigenvalue, stopping executing of a program, and notifying the upper level system that the calculated eigenvalue does not match the pre-stored eigenvalue; and
    operation (d) of calculating an eigenvalue of an operating system (OS) program of the controller stored in a non-volatile memory; and
    operation (e) of receiving a pre-stored eigenvalue of the OS program from the upper level system, comparing the pre-stored eigenvalue with the calculated eigenvalue of the OS program to verify whether the pre-stored eigenvalue matches the calculated eigenvalue, when the pre-stored eigenvalue matches the calculated eigenvalue, executing the OS program, and when the pre-stored eigenvalue does not match the calculated eigenvalue, stopping the executing of the program and notifying the upper level system that the calculated eigenvalue does not match the pre-stored eigenvalue.

2. The method of claim 1, wherein the operation (d) further includes operation (d1) of, when the OS program of the controller is stored in a random-access memory (RAM), calculating the eigenvalue of the OS program.

3. The method of claim 1, further comprising:
    operation (f) of periodically calculating an eigenvalue of a program of the controller; and
    operation (g) of comparing the eigenvalue of the program calculated in operation (f) with an eigenvalue of the corresponding program pre-stored in the upper level system to verify whether the calculated eigenvalue matches the pre-stored eigenvalue, and when the calculated eigenvalue does not match the pre-stored eigenvalue, stopping the executing of the program and notifying the upper level system that the calculated eigenvalue does not match the pre-stored eigenvalue.

4. The method of claim 1, further comprising, before the operation (a), operation (a0) of, when a program of the controller is stored in the upper level system, calculating and storing an eigenvalue of the program of the controller in advance.

5. The method of claim 4, wherein the operation (a0) further includes:
    operation (a01) of receiving, by the upper level system, an update command from the controller and receiving a new controller program;
    operation (a02) of calculating and storing an eigenvalue of the new controller program in the upper level system;
    operation (a03) of downloading the new controller program to the controller;
    operation (a04) of temporarily storing, by the controller, the downloaded new controller program in a random-access memory (RAM); and
    operation (a05) of calculating, by the controller, an eigenvalue of the new controller program, comparing the calculated eigenvalue with an eigenvalue of the new controller program stored in the upper level system to verify whether the calculated eigenvalue matches the stored eigenvalue, when the calculated eigenvalue matches the stored eigenvalue, storing the new controller program in the controller, and when the calculated eigenvalue does not match the stored eigenvalue, discarding a program temporarily stored in the RAM.

\* \* \* \* \*